Oct. 9, 1928.

E. RINGEL

LAND ROLLER

Filed Nov. 3, 1927      2 Sheets-Sheet 1

Inventor
Edwin Ringel,
By L. F. Vandrush Jr.
Attorney

Oct. 9, 1928.  
E. RINGEL  
1,687,389  
LAND ROLLER  
Filed Nov. 3, 1927  2 Sheets-Sheet 2
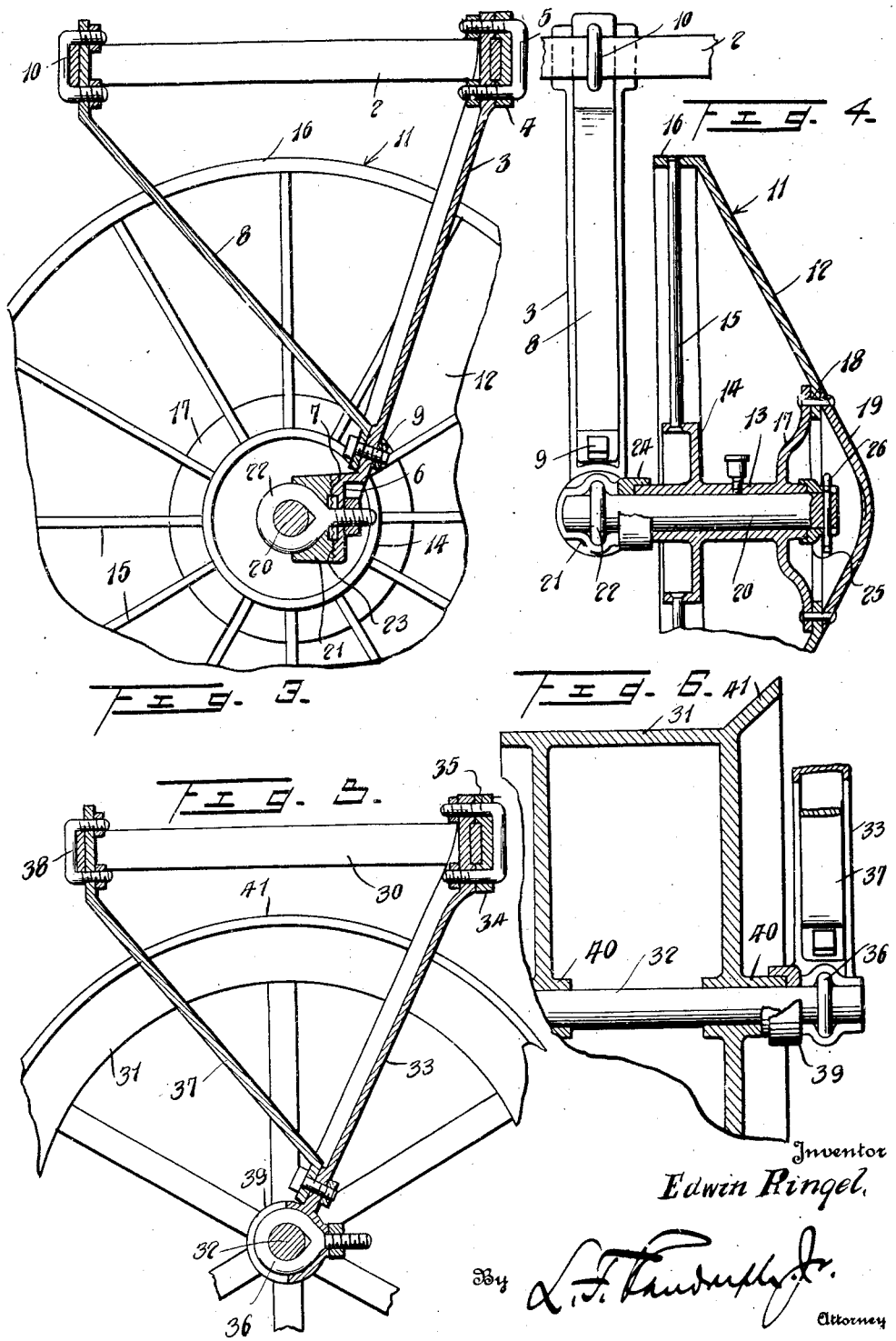

Patented Oct. 9, 1928.

1,687,389

UNITED STATES PATENT OFFICE.

EDWIN RINGEL, OF ALMA, KANSAS.

LAND ROLLER.

Application filed November 3, 1927. Serial No. 230,837.

The invention relates to agricultural implements and especially to the class of implements as land rollers and has for its principal object the provision of an improved construction of land rollers designed to be used for packing the ground in the furrow after the planting of seed, such for instance as corn, and providing means for crushing any clods that there may be in the furrow and also to crush the clods on the ridges of the furrow.

A further object of the invention is the provision of a land roller consisting of two sets of rollers, one set comprising a pair of conical shaped rollers having the larger portions of the rollers adjacent one another and secured to a draft tongue, said conical rollers being adapted to run in the furrow that has been made for planting seed, such for instance as corn, after the corn has been planted, to crush the clods that may have been left in the furrow and at the same time pack the earth around the planted seed. The invention also includes a beam loosely connected with the draft tongue to permit up and down and sidewise movement of the beam relatively to the tongue when in operation, said beam having supported thereon other rollers of cylindrical type and having inclined flanges on their adjacent ends, said rollers running on the ridges of the furrow and designed to break clods, etc. on ridges.

The invention will be described in detail hereinafter and will be found illustrated in the accompanying drawings in which—

Figure 1:
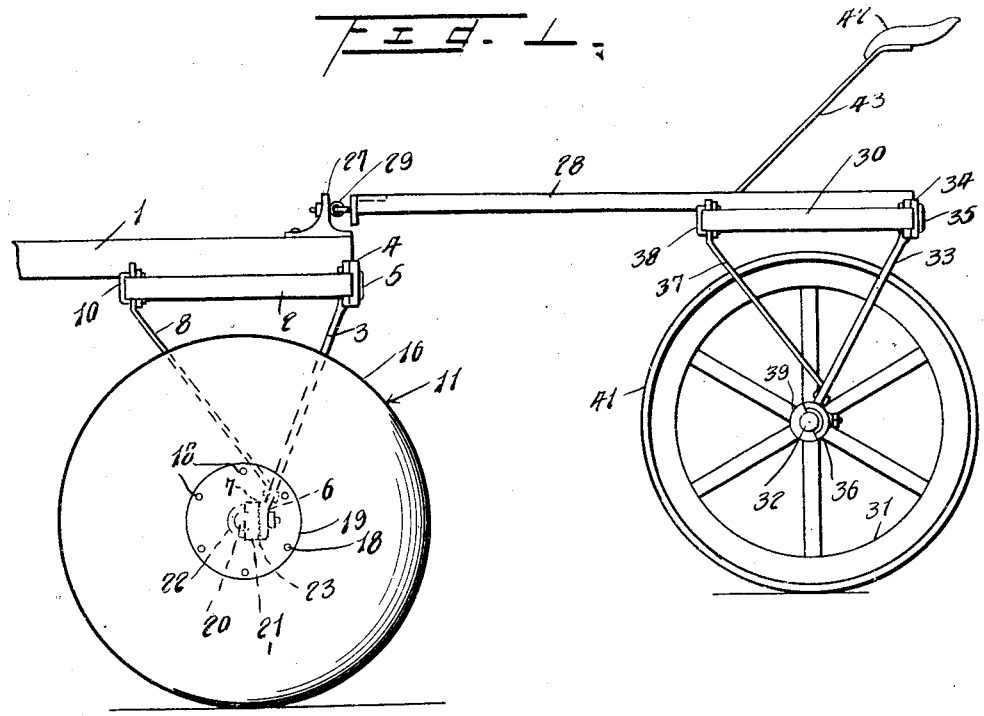
Figure 2:
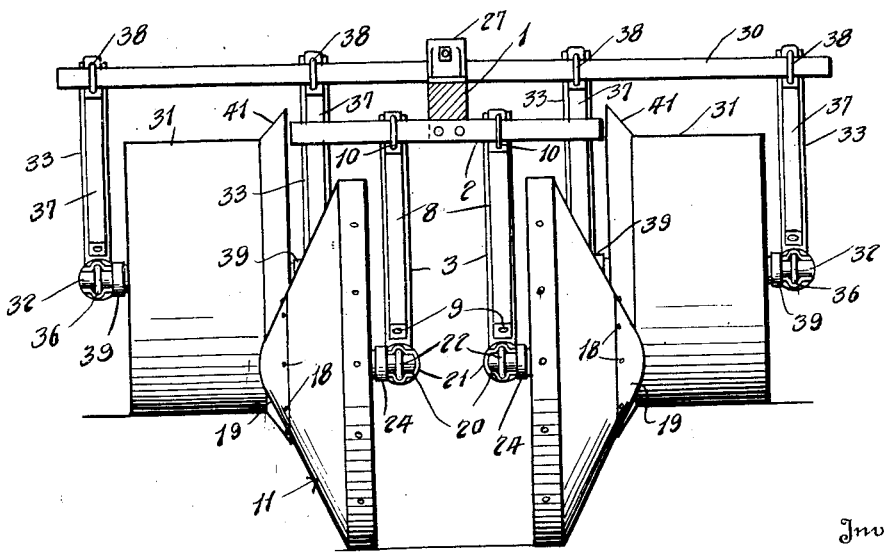

Figure 1 is a side view in elevation of the improved land roller, the draft tongue being shown partly broken away, Figure 2 is a front view of the machine disclosed in Figure 1, Figures 3 and 4 are detail views partly in section on different planes of the conical shaped rollers, and Figures 5 and 6 are similar views of the cylindrical rollers.

In the drawings similar reference characters are used to designate corresponding parts throughout the several views.

The improved land roller comprises a draft tongue 1 having secured thereto a rectangular frame 2. 3 are supporting members secured to one side of the frame 2, preferably the rear side, by means of clamp plates 4 and U-shaped clips 5, said supporting members 3 being inclined forwardly and downwardly as shown, and having on their lower ends bearing plates 6 having their bearing faces roughened as shown at 7. A brace 8 is secured to each supporting member 3 adjacent to the bearing plate 6 by means of a bolt or other suitable fastening member 9 and is connected to the front side of the frame 2 by means of a U-shaped clip 10. It will be understood that the supporting members 3 and the braces 8 may be adjusted relatively to the draft tongue 1 as may be desired by loosening the clips 5 and 10 and sliding the members on the frame 2 so that the rollers supported on said members, that are to be hereinafter described, may be arranged for operation in furrows of different widths. The land rollers 11 that are adapted to run in the furrow have their outer sides shaped conically as shown at 12, 13 indicating the hub of the roller and having an L-shaped flange 14 thereon to which the spokes 15 engaging the rim 16 are secured. 17 designates another flange carried by the hub 13 to which is secured the outer edge of the conical shaped portion 12 by means of rivets 18 or other suitable fastening, 19 designating a cap piece that is shaped to conform to the conical portion 12 and also secured in position by the rivets 18. The hubs 13 are journaled on axles 20 that are secured to bearing blocks 21 by means of eye bolts 22, the axles fitting in the eyes of the eye bolts, while the stems of the bolts engage through the blocks 21 and the bearing plate 6, the blocks 21 being roughened as shown at 23 to engage the roughened surface 7 of the bearing plate. By this construction it will be apparent that the axles 20 may be adjusted to different inclinations as may be desired relatively to the supporting members 3. 24 and 25 designate caps at opposite ends of each of the hubs 13 and recessed to receive the ends of the hubs, said caps being designed to prevent the escape of grease or other lubricant and also to prevent foreign matter getting into the journals. The cap 25 is held in position by means of a cotter pin or other suitable fastening 26 secured to the cap 25 and the end of the axle 20.

Secured to said tongue 1 is an upstanding bracket 27 to which is connected a beam 28 by means of interengaging eye bolts 29 forming a loose connection between the tongue 1 and the beam 28 to permit up and down and sidewise movement of the beam 28 relatively to the tongue. A rectangular frame 30 is carried by the beam 28 and supports cylindrical rollers 31 that are rotatably mounted on axles 32 carried by the supporting members 33 secured to the rear side of the frame 30 by means of clamping blocks 34 and U-clips 35, 36 designating eye bolts in which the ends of the axles 32 are engaged and secured to the lower ends of said supporting members 33. 37 indicate braces engaging said supporting members 33, and secured to the front side of the frame 30 by means of U-clips 38. 39 indicates caps at the ends of hub members 40 of the rollers 31 to prevent sliding movement of the hubs 40 on the axles 32. Rollers 31 are provided with outwardly inclined flanges 41, it being understood that the rollers 31 ride on the ridges of the furrow in which the rollers 11 engage, the flanges 41 serving to guide the rollers 31 to keep them on the ridges. An operator's seat 42 is supported by means of an upright member 43 on beam 28.

In use, as has heretofore been stated, the conical rollers 11 by engaging in the furrow, and being adjustable, by arranging the angularity of the axles 20, and adjusting the supporting members 3 and the braces 8 relatively to the draft tongue 1, may be arranged to crush clods in the furrow and to press down the earth on the planted corn or other seed, while the rollers 31 will roll the earth and press the clods along the ridges of the furrow, said rollers 31 being also adjustable in the same manner as rollers 11 toward and from the beam 28.

What is claimed is:—

A land roller, comprising a draft tongue, a frame secured thereto, supporting members carried by said frame, axles carried by said supporting members, conical rollers journaled on the axles and adapted to engage in a furrow to break clods therein and pack the ground on planted seed, a beam loosely connected to the tongue, a frame carried by said beam, supporting members carried by the frame, axles carried by pairs of said supporting members, and rollers journaled on said axles and adapted to engage the ridges of said furrow.

In testimony whereof I affix my signature.

EDWIN RINGEL.